(12) United States Patent
Kim

(10) Patent No.: US 6,795,449 B1
(45) Date of Patent: Sep. 21, 2004

(54) METHOD OF STAINING TARGET INTERPHASE CHROMOSOMAL DNA

(75) Inventor: Dong Hyun Kim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,730

(22) Filed: Dec. 31, 1998

(30) Foreign Application Priority Data

Nov. 17, 1998 (KR) .............................................. 98-49282

(51) Int. Cl.[7] .............................. H04J 3/16; H04J 3/17
(52) U.S. Cl. ....................... 370/443; 370/310; 370/329; 370/337; 370/414; 370/431; 370/443; 370/445; 370/447; 370/458; 370/461; 370/462; 370/465; 370/310.1; 370/395.1; 370/395.2
(58) Field of Search ................................ 370/310, 329, 370/336, 337, 395, 412, 414, 418, 431, 437, 442, 443, 445, 447, 458, 461, 462, 464, 465, 473, 498, 522, 910, 912, 915, 310.1, 389, 395.1, 395.2

(56) References Cited

U.S. PATENT DOCUMENTS

| | | | | |
|---|---|---|---|---|
| 5,012,469 A | * | 4/1991 | Sardana ...................... 370/95.3 |
| 5,257,257 A | * | 10/1993 | Chen et al. .................... 370/18 |
| 5,471,474 A | * | 11/1995 | Grobicki et al. ........... 370/85.2 |
| 5,483,550 A | * | 1/1996 | Hulbert ....................... 375/202 |
| 5,625,877 A | * | 4/1997 | Dunn et al. .................. 370/329 |
| 5,638,371 A | * | 6/1997 | Raychaudhuri et al. ..... 370/347 |
| 5,784,362 A | * | 7/1998 | Turina ......................... 370/321 |
| 5,953,341 A | * | 9/1999 | Yamanaka et al. .......... 370/416 |
| 5,953,344 A | * | 9/1999 | Dail et al. ................... 370/443 |
| 5,978,368 A | * | 11/1999 | Hjelm et al. ................ 370/347 |
| 6,028,860 A | * | 2/2000 | Laubach et al. ............ 370/395 |
| 6,031,832 A | * | 2/2000 | Turina ........................ 370/348 |
| 6,038,607 A | * | 3/2000 | Hamilton et al. ........... 709/236 |
| 6,072,784 A | * | 6/2000 | Agrawal et al. ............ 370/311 |
| 6,091,741 A | * | 7/2000 | Fujiwara et al. ............ 370/465 |
| 6,101,182 A | * | 8/2000 | Sistanizadeh et al. ....... 370/352 |
| 6,112,085 A | * | 8/2000 | Garner et al. ............... 455/428 |
| 6,175,558 B1 | * | 1/2001 | Miya .......................... 370/335 |
| 6,219,355 B1 | * | 4/2001 | Brodigan .................... 370/486 |
| 6,236,678 B1 | * | 5/2001 | Horton, Jr. et al. ......... 370/395 |
| 6,240,083 B1 | * | 5/2001 | Wright et al. ............... 370/348 |
| 6,272,144 B1 | * | 8/2001 | Berenbaum et al. ........ 370/419 |
| 6,282,187 B1 | * | 8/2001 | Evans et al. ................ 370/347 |
| 6,347,091 B1 | * | 2/2002 | Wallentin et al. .......... 370/437 |
| 6,351,773 B1 | * | 2/2002 | Jijolek et al. ............... 709/228 |
| 6,594,238 B1 | * | 7/2003 | Wallentin et al. .......... 370/252 |

OTHER PUBLICATIONS

J. Chen and V. Li. Reservation CSMA/CD: A Multiple Access Protocol for LAN's. IEEE Journal on Selected Areas in Communications. vol. 7, No. 2, Feb. 1989. pp. 202–210.*

* cited by examiner

Primary Examiner—Hanh Nguyen
(74) Attorney, Agent, or Firm—Fleshner & Kim, LLP

(57) ABSTRACT

Disclosed is a channel allocation method on performing a data communication in a wide band wireless multi-media communication system, which allocates selectively reserved time slots or contention time slots, according to the quantity of data to be sent. In the method, contention time slots are used for sending data if the quantity of data to be sent is smaller than a critical value, or reserved time slots are used if the data quantity is greater than the critical value.

23 Claims, 10 Drawing Sheets

METHOD OF STAINING TARGET INTERPHASE CHROMOSOMAL DNA

BACKGROUND OF THE INVENTION

1. Field of the Invention

The present invention relates to a wide band wireless communication system. More particularly, this invention relates to a channel allocation method for efficiently allocating channels in accordance with the quantity of data when transmitting data from a customer premises equipment unit to a head-end unit.

2. Description of the Related Arts

A conventional wide band wireless multimedia communication system generally includes a central office unit, a head-end unit, a hub outdoor unit, and a customer premises equipment unit.

The central office unit plays a role in exchanging data, managing customers, supervising a network, linking a network, connecting to an internet, and the like. The head-end unit communicates with the central office unit and transmits data to the customer premises equipment unit. In addition, the head-end unit handles data transmitted from the customer premises equipment unit, and provides the data to the devices in the central office unit. The hub outdoor unit modulates the data received from the head-end unit into a wireless signal, and receives a wireless signal from the customer premises equipment unit and relays the wireless signal to the head-end unit. The customer premises equipment unit is located in a customer's house so that the customer can utilize a telephone, an internet, a television, etc.

In the conventional wide band wireless multimedia communication system constructed as above, the customer premises equipment unit has used only reserved channels when sending internet data. The way of sending the reserved channel-based data has had an advantage that customers can be stably provided with data, without delay. However, in light of the characteristics of an internet communication, the quantity of the data that customers send to the head-end unit is relatively smaller than the data received. Thus, the system is continuously occupying wireless channels even when a customer does not send data. This type of channel allocation makes resources which are limited to the system be not efficiently utilized.

To compensate for this problem, it was suggested that channels were occupied only when there were data to be sent, and after sending the data, channels were released for another customer's use. In the case of sending data using only a contention time slot instead of a reserved time slot, there arise no problems when a traffic is light. However, as the number of customers increases, there arise a data conflict due to a contention time slot and a delay between the data cells which are to be successively sent, thereby data continuity being broken off.

SUMMARY OF THE INVENTION

It is an object of the present invention to provide a channel allocation method on performing a data communication in a wide band wireless multi-media communication system, which allocates selectively reserved time slots or contention time slots, according to the quantity of data to be sent.

To achieve the object, the present invention uses contention time slots for sending data if the quantity of the data is smaller than a critical value, or reserved time slots if the data quantity is greater than the critical value.

Hereinafter, a frame is the basic unit of data, which can be sent at a time.

BRIEF DESCRIPTION OF THE DRAWINGS

The objects, features, and advantages of the present invention will be apparent to one skilled in the art in light of the following detailed description, in which.

DETAILED DESCRIPTION OF THE PREFERRED EMBODIMENT

In the following, a preferred embodiment of a wide band wireless multimedia communication system according to the present invention will be described with reference to the attached drawings.

Figure 1:
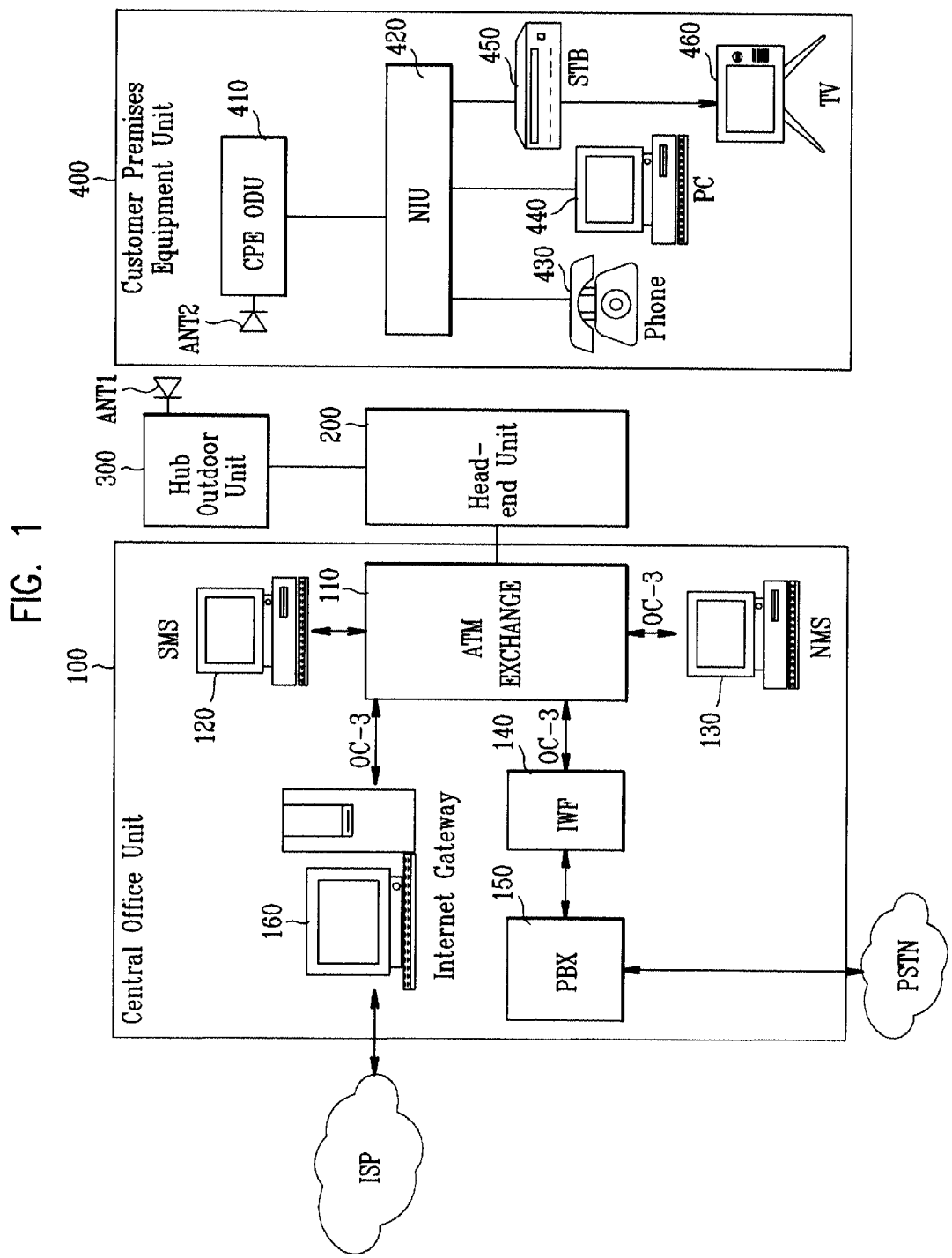
FIG. 1 is a block diagram showing a part of a wide band wireless multimedia communication system according to the present invention.

FIG. 1 shows a part of a wide band wireless multimedia communication system according to the present invention. Referring to FIG. 1, a wide band wireless multimedia communication system is generally composed of a central office unit 100, a head-end unit 200, a hub outdoor unit 300, and a customer premises equipment unit 400.

Figure 2:
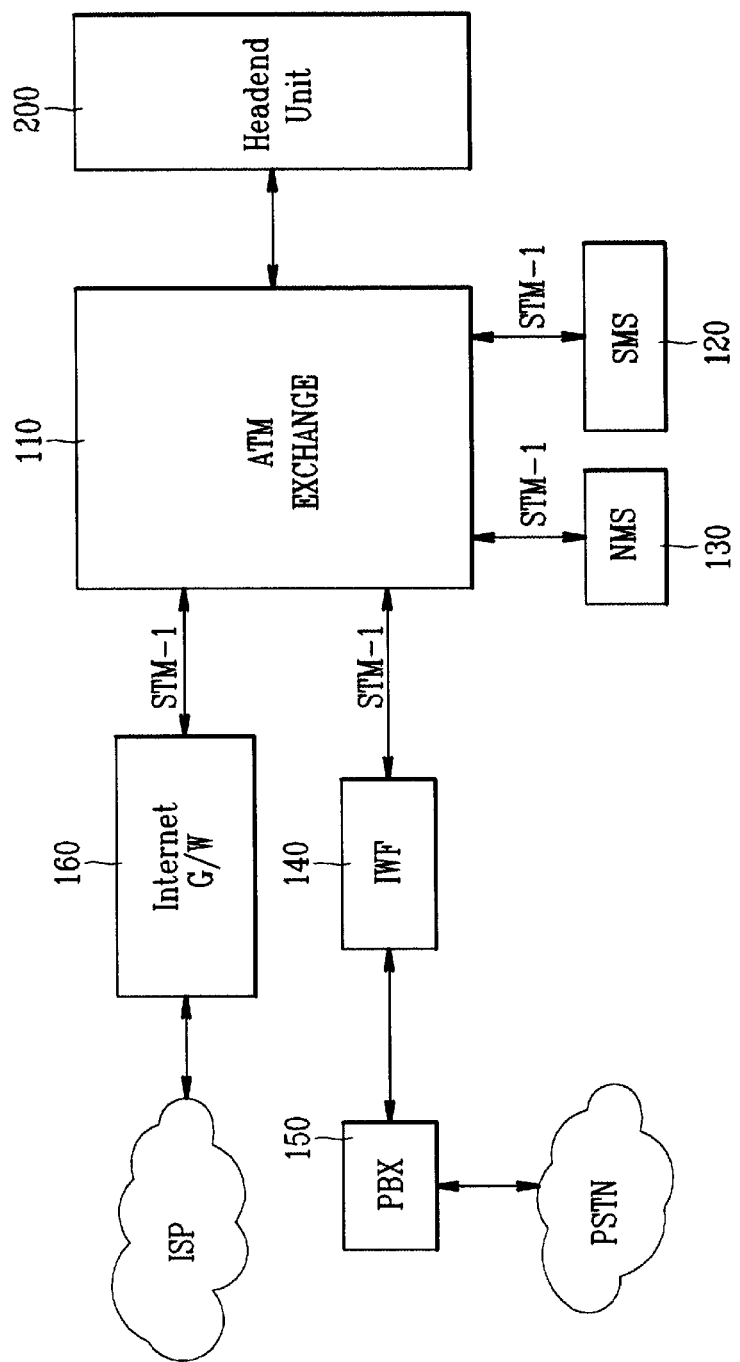
FIG. 2 is a block diagram of a central office unit shown in FIG. 1.

The central office unit 100 is comprised of, as shown in FIG. 2, an asynchronous transfer mode(ATM) exchange 110, a subscriber management system(SMS) 120, a network management system(NMS) 130, an interworking function system(IWF) 140, a private branch exchange(PBX) 150, and an internet gateway 160. The PBX 150 is connected with a public switched telephone network(PSTN), and the internet gateway 160 is connected with an internet service provider (ISP).

The ATM exchange 110 plays a role in analyzing and exchanging ATM cell-structured data used in a local multi-point distribution service(LMDS). The LMDS can transmit TV broadcast data in the respective ATM cells, and perform a bidirectional communication on digital data and audio data. Therefore, the data used in a wide band wireless multimedia communication system according to the present invention, can be represented by the TV broadcast data, the digital data, the audio data, etc.

The SMS 120 takes charge of managing the operation, status, or information of the customer premises equipment unit 400, by exchanging information with the ATM exchange 110.

The NMS 130 manages, through an optical carrier-3(OC-3), the connection, and its status, between the ATM exchange 110 and the hub outdoor unit 300. It also manages the status of the medium between it and the customer premises equipment unit 400.

The IWF 140 plays a role in matching, when data is exchanged between the ATM exchange 110 and the PBX 150, the ATM exchange 110 and the PBX 150 so that they can operate in linkage. To perform this role, the IWF 140 is equipped in hardware and software modules. Herein, the data exchanged between the ATM exchange 110 and the PBX 150 is generally of a text, image, and packet data.

The PBX 150 plays a role in managing the billing information to the customer premises equipment unit 400, when using a WLL(wireless local loop) as a private network service. In addition, it operates in linkage with PSTN in order to perform a data communication according to the present invention.

The internet gateway 160 plays a role of agate for providing the customer premises equipment unit 400 with an asynchronous transfer mode(ATM) service and a local area network(LAN) service. For this purpose, the internet gateway 160 is connected to the ISP(internet service provider). Herein, the customer premises equipment unit 400 is organized by, see FIG. 5, a customer premises equipment outdoor unit(CPE ODU) 410, a network interface unit(NIU) 420, and peripheral devices, such as a telephone 430, a personal computer 440, a set-top box(STB) 450, a television receiver 460, etc. In the customer premises equipment unit 400, the organization of the network interface unit 420 and the peripheral devices varies as to whether a wide band wireless multimedia communication system of the present invention is used either for a home or for an office.

The head-end unit 200 and the hub outdoor unit 300 shown in FIG. 1, will be described more in detail with reference to FIGS. 3 and 4.

Figure 3:
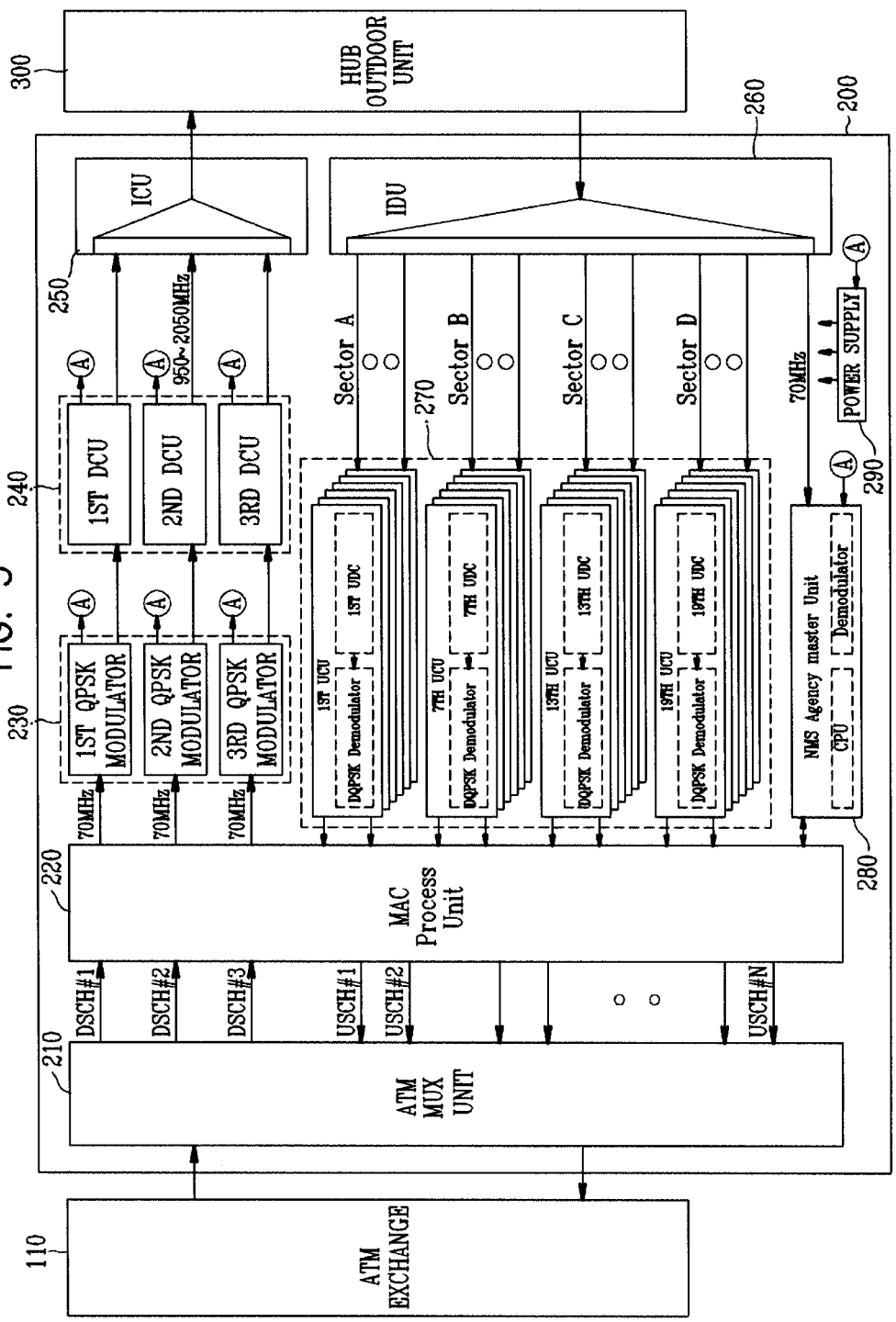
FIG. 3 is a block diagram of a head-end unit shown in FIG. 1.

FIG. 3 is a block diagram of the head-end unit shown in FIG. 1. Referring to FIG. 3, the head-end unit 200 is organized by an ATM multiplexer unit 210, a medium access control(MAC) processor unit 220, a plurality of quadrature phase shift keying(QPSK) modulators 230, a plurality of downstream channel units(DCU) 240, an indoor combiner unit(ICU) 250, an indoor divider unit(IDU) 260, a plurality of upstream channel unit(UCU) 270, a network management system(NMS) agency master unit 280, and a power supply unit 290.

The ATM multiplexer unit 210 analyzes again the ATM cell-structured data which were analyzed by the ATM exchange 110, multiplexes the re-analyzed data, and provides it to the MAC processor unit 220 so as to give the data to the DCUs 240. In the mean time, the ATM multiplexer unit 210 demultiplexes the data received, via the UCUs 270 and the MAC processor unit 220, from the CPE ODU 410, and provides the demultiplexed data to the ATM exchange 110 of the central office unit 100.

The MAC processor unit 220 receives a plurality of downstream channel data multiplexed in the ATM multiplexer unit 210, formats the respective frames proper to a multimedia communication, and provides the frames to the QPSK modulators 230. In the mean time, the MAC processor unit 220 analyzes the data received from the UCUs 270, and provides the analyzed ATM cell-structured data to the ATM multiplexer unit 210 under the prescribed protocol.

The QPSK modulators 230 modulate the downstream channel data received from the MAC processor unit 220 into the packet data of 188 bytes, perform channel coding, and provide the coded data to the DCUs 240. Channel coding is performed either by using convolutional coding or by convolutional interleaving or by Reed-Solomon coding.

The DCUs 240 frequency-convert the carrier data received from the QPSK modulators 230 into the radio frequency(RF) channels within the range from 950 to 2050 MHz, amplify the respective channels, and provide them to the ICU 250.

The ICU 250 combines the downstream channel RF data received from the DCUs 240, and provides the combined data to the hub outdoor unit 300 through a coaxial cable.

The IDU 260 distributes the upstream channel RF data received from the hub outdoor unit 300 into a plurality of channels, and provides the distributed channels to the UCUs 270.

The UCUs 270 frequency-converts the carrier of the upstream channel RF data received from the IDU 260 into a channel of 70 MHz, demodulates this channel, and provides the channel to the MAC processor unit 220.

The NMS agency master unit 280 includes a central processing unit(CPU, not shown) for collecting information on the operational status of the devices in the head-end unit 200, such as the QPSK modulators 230, the DCUs 240, the UCUs 270, and the power supply unit 290, and for provideing the information to the MAC processor unit 220; and a demodulator(not shown) for demodulates and extracts the data from the signals modulated by the NMS agency slave unit 340 of the hub outdoor unit 300, and for providing the extracted data to the MAC processor unit 220.

The power supply unit 290 supplies a stable power source to all the devices of the head-end unit 200, and reports its own operational status to the NMS agency master unit 280.

Figure 4:
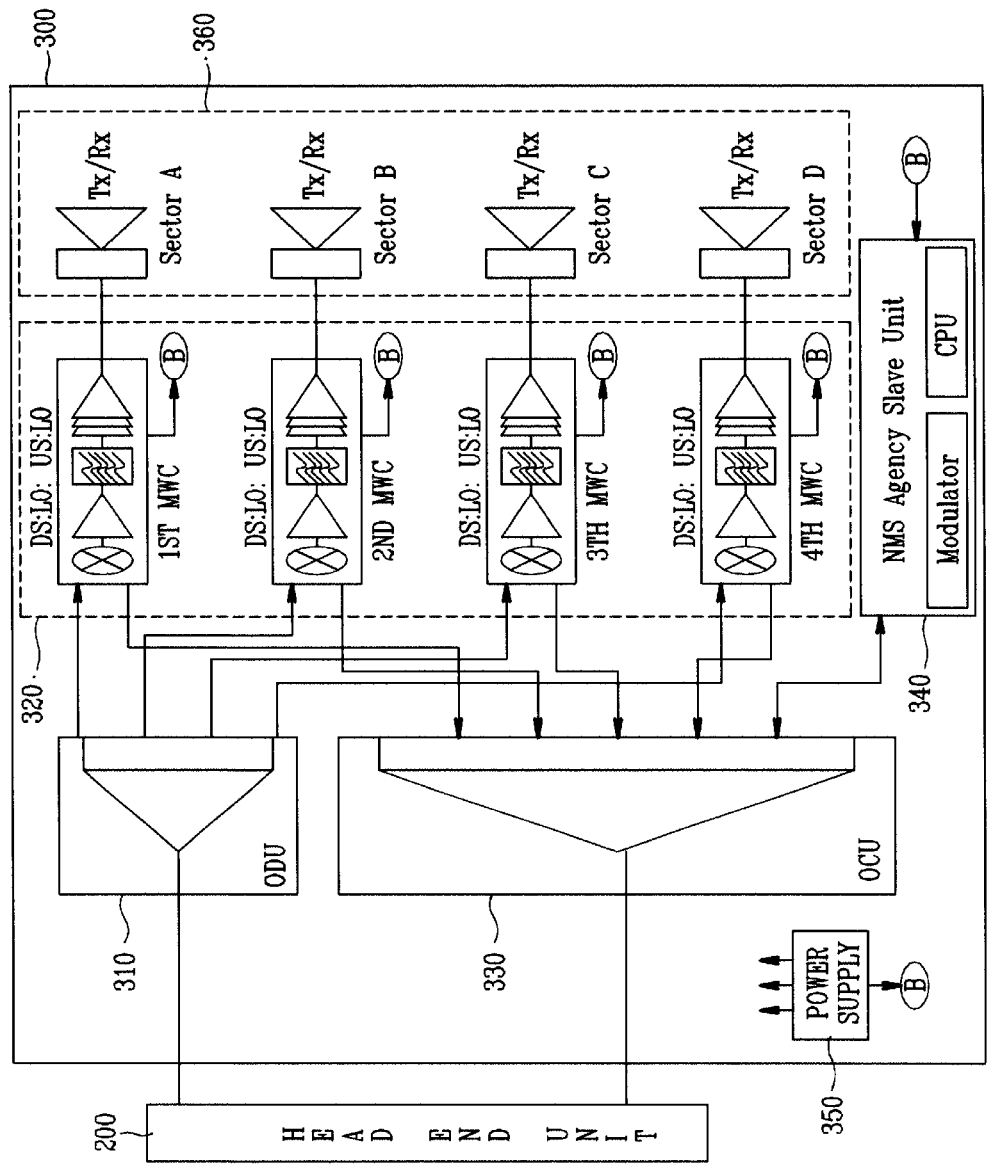
FIG. 4 is a block diagram of a hub outdoor unit shown in FIG. 1.

FIG. 4 is a block diagram of the hub outdoor unit 300 shown in FIG. 1. Referring to FIG. 4, the hub outdoor unit 300 is organized by the outdoor divider unit(ODU) 310, a plurality of microwave converter units(MWC) 320, an outdoor combiner unit(OCU) 330, a network management system(NMS) agency slave unit 340, a power supply unit 350, and a plurality of high directional antennas 360.

The ODU 310 distributes the RF data modulated by the head-end unit 200 into the MWCs 320.

The MWCs 320 frequency-convert the RF data received from the ODU 310 into the microwave signals, amplify the microwave signals, and radiate the amplified signals into the air through the high directional antennas 300. In the mean time, the MWCs 320 receive the microwave signals traveling through the air from the CPE ODU 400, frequency-convert the microwave signals into the intermediate frequency(400~700 MHz), and provide them to the OCU 330.

The OCU 330 combines the plurality of intermediate frequency data provided from the MWCs 320, and provides the combined data to the IDU 260 of the head-end unit 200, through a coaxial cable.

The NMS agency slave unit 340 collects the information on the operational status of the MWC 320 and the power supply unit 350, and digitizes the information, and provides to the OCU 330, finally giving the digitized signal to the NMS agency master unit 280 of the head-end unit 200.

The power supply unit 350 supplies a stable power source to all the devices of the hub outdoor unit 300, and reports its own operational status to the NMS agency slave unit 340.

The high directional antennas 360 radiate the signals coming from the MWCs 320 into the air. The beam angle of the antennas 360 must be adjusted to a prescribed direction at the time the wide band wireless multimedia communication system according to the present invention is set up.

Figure 5:
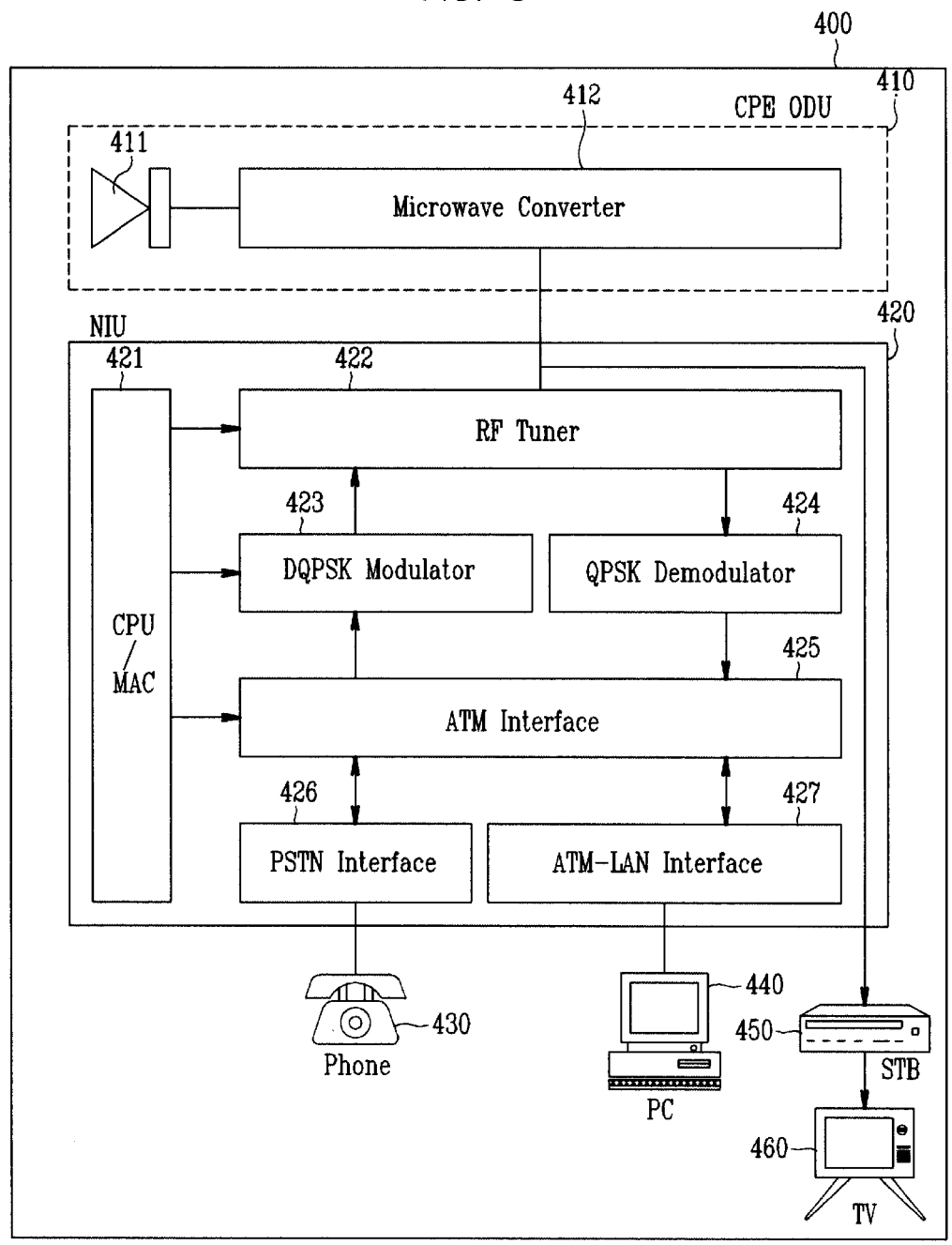
FIG. 5 is a block diagram of a customer premises equipment outdoor unit shown in FIG. 1.

FIG. 5 is a block diagram showing the customer premises equipment unit 400 shown in FIG. 1. Referring to FIG. 5. the customer premises equipment unit 400 is organized by a customer premises equipment outdoor unit(CPE ODU) 410, a network interface unit(NIU) 420, and the peripheral devices 430, 440, 450, and 460. The CPE ODU 410 includes a high directional antenna 411 and a microwave converter 412. The NIU 420 is organized by a control unit(CPU) 421, a radio frequency(RF) tuner 422, a differential quadrature phase shift keying(DQPSK) modulator 423, a QPSK demodulator 424, an ATM interface 425, a public switched telephone network(PSTN) interface 426, and an asynchronous transfer mode/local area network(ATM-LAN) interface 427.

The microwave converter 412 of the CPE ODU 410 frequency-converts the intermediate frequency data, which was converted at the MWCs 320 of the hub outdoor unit 300 and received by the antenna 41 1, into the RF data of 950~2050 MHz, and provides the RF data to the RF tuner 422. Meanwhile, the microwave converter 412 frequency-converts the intermediate frequency upstream channel data provided by the RF tuner 422 into the upstream microwave band signal, amplifies the frequency-converted data up to 100~500 mV, and radiates the microwave signal into the air through the high directional antenna 411. Herein, the antenna 411 must be set up so that it can visible-distance-communicate with the antennas 360 of the hub outdoor unit 300. Thus, the antenna 411 of the customer premises equipment unit 400 must be posted to be arranged in the line of sight with the antenna 360 of the hub outdoor unit 300.

The CPU 421 of the NIU 420 controls the frequency of the upstream or downstream channel data passing through the RF tuner 422, and formats the data from the ATM interface 425, so as to be able to provide to the DQPSK modulator 423. In addition, the CPU 421 deals with the data demodulated by the QPSK demodulator 424, and controls the ATM interface 425 and all of the devices in the NIU 420.

The RF tuner 422 of the NIU 420 either selects a particular channel out of the range of the downstream channel transmitted from the hub outdoor unit 300 and provides the selected channel to the QPSK demodulator 424, or receives the modulated data from the DQPSK modulator 423 to transmit it to the hub outdoor unit 300.

The DQPSK modulator 423 of the NIU 420 differentially quadrature-phase-shift modulates the channel coded data. The QPSK demodulator 424 quadrature-phase-shift demodulates the data transmitted from the hub outdoor unit 300, performs channel coding, and provides the channel coded data to the ATM interface 425.

The ATM interface 425 of the NIU 420 performs cell segmentation and reassembly, and provides the ATM cell-structured data transmitted from the hub outdoor unit 300 either to the PSTN interface 426 or to the ATM-LAN interface 427, according to the data types. In addition, the ATM interface 425 formats the data to be sent from the CPE ODU 400 to the hub outdoor unit 300 into the upstream channel frame, and provides the formatted frame to the DQPSK modulator 423.

The PSTN interface 426 deals with a constant bit rate (CBR) service of an ATM application layer type 1(AAL-1), so that telephoning can be possible.

The ATM-LAN interface 427 deals with a variable bit rate(VBR) service of an ATM application layer type 5(AAL-5), in order to communicate on packet data with a personal computer 440.

A telephone 430, one of the peripheral devices in the customer premises equipment unit 400, is for service to a WLL, and a personal computer 440 is for service to a wireless LAN. A set-top box(STB) 450 is for reception of a unidirectional wireless CATV, which the STB 450 is connected to a TV 460 to display a TV image.

Hereafter, a wireless channel allocation method on performing data communication according to an embodiment of the present invention, with reference to FIGS. 6 to 10.

Figure 6:
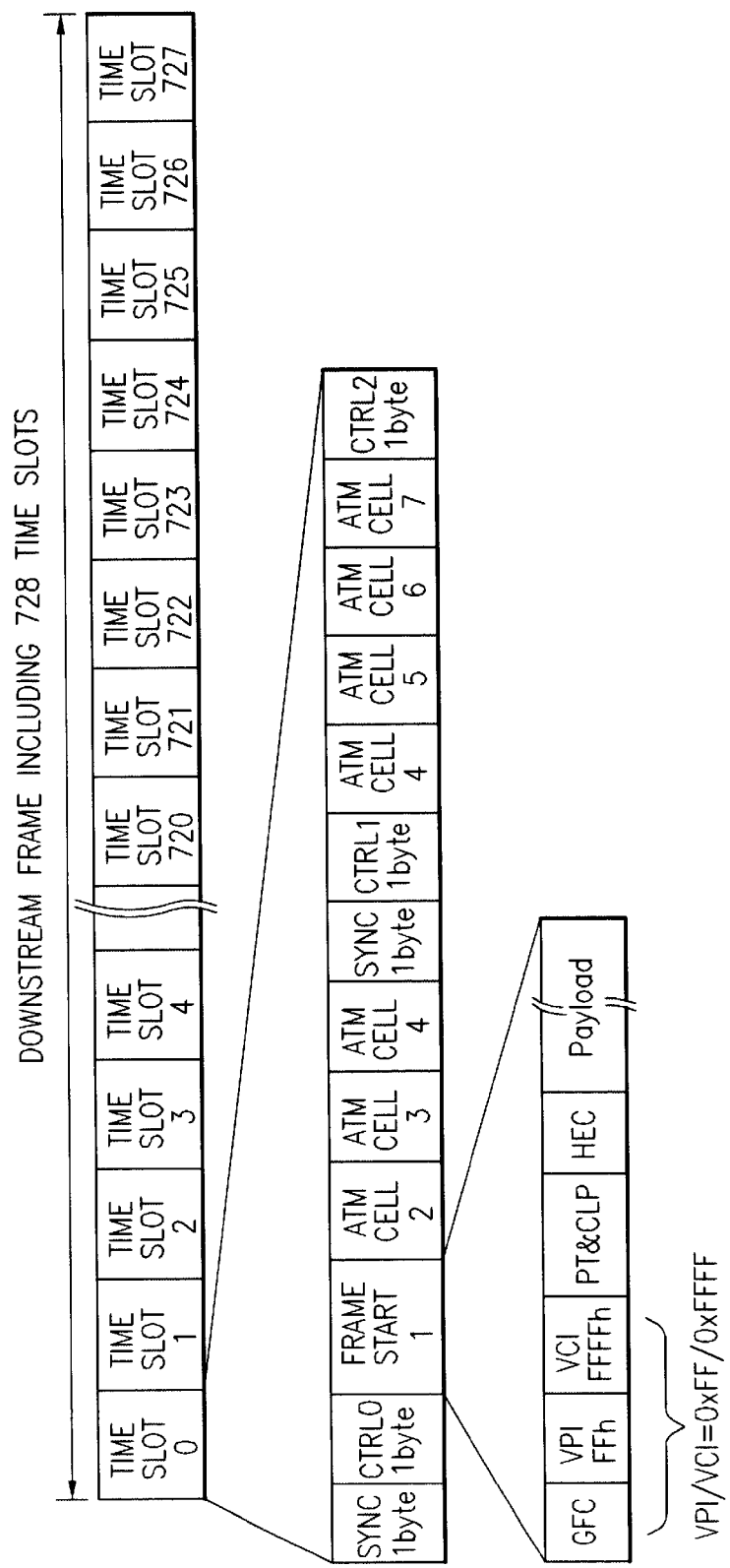
FIG. 6 shows a downstream frame of an embodiment of the present invention.

A wide band wireless multimedia communication system according to the present invention provides subscribers with bidirectional services. FIG. 6 is a downstream frame format according to one embodiment of the present invention. One downstream frame has 728 time slots. The first time slot is named "frame start". The MAC processor unit 220 sends VPI/VCI values of the ATM cell of the frame start slot to 0xFF/0xFFFF, of which the value is all "1", so that all of the NIU 420 can be synchronized to one another.

In the time slot which the NIU 420 is able to send up, there are three types: a polling-response time slot, a contention time slot, and a reserved time slot. As to the polling-response time slot, whenever the head-end unit 200 polls all the subscribers at regular time intervals, the customer premises equipment unit 400 responds to the polling. Usually, this type of time slot is the first one of the upstream channels. Response to the polling may not be exactly synchronized with the time slot. Because this type of signal may affect the other time slot signals, two protection time slots are provided. The head-end unit 200 analyzes the frequency, intensity, or synchronization of the signal received from the customer premises equipment unit 400,: and measures whether the error exists comparing to a standard signal. If no error is measured, it polls another customer premises equipment unit. If error is found, it sends the error value to the customer premises equipment unit to correct the error, and is given the corrected signal. The head-end unit 200 repeats the above action until there is no error.

The contention time slot is used when the customer premises equipment unit 400 sends to the NIU 420 the MAC messages, such as a reserved channel request, channel release, etc., or signaling messages. The MAC messages and signaling messages are not for a general user. In the contention time slot according to the Digital Audio/Visual Council(DAVIC), because many NIUs, rather than a particular NIU 420, can be used simultaneously, data conflicts may occur. The NIU 420 can find whether the conflict occurred by detecting the status of the contention time slot in the downstream messages sent from the MAC processor unit 220. The MAC processor unit 220 finding the conflict waits for a certain delay according to the method of random resend delay, and resends the data.

The reserved time slot is accomplished by the customer premises equipment unit sending the reserved channel request message to the channel to be contend, and receiving the acknowledge message from the MAC processor unit 220.

Figure 7:
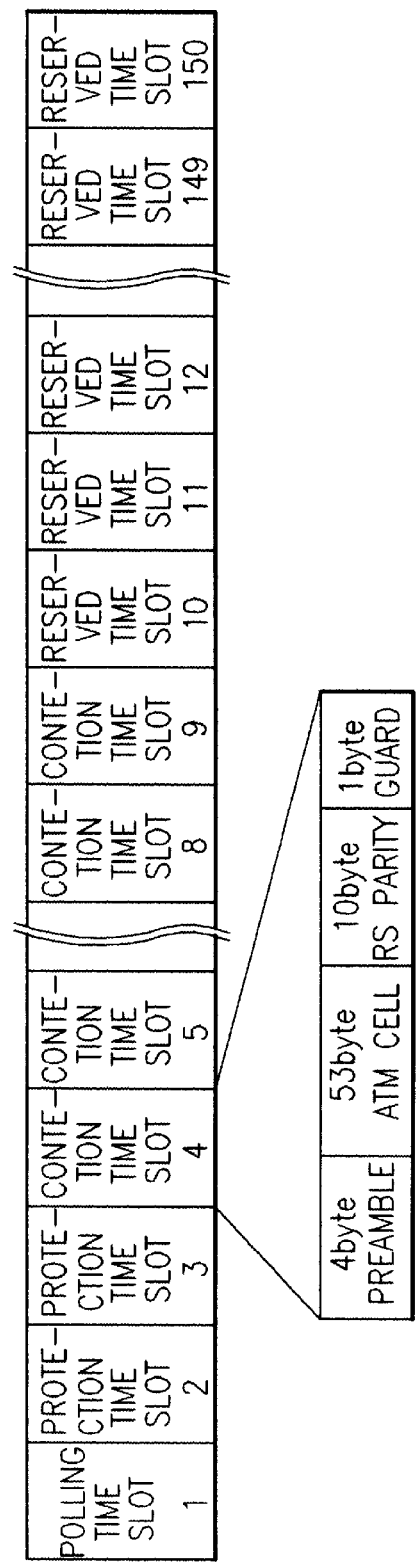
FIG. 7 shows an upstream time slot of an embodiment of the present invention.

FIG. 7 is an upstream frame format according to one embodiment of the present invention. Referring to FIG. 7, there are one polling-response time slot, two protection time slots, six contention time slots, and 141 reserved time slots in a frame.

In the embodiment of the present invention, operation between the NIU 420 and a personal computer 440 of the customer premises equipment unit 400 and the MAC processor unit 220 of the head-end unit 200, will be mainly described.

In this invention, if the quantity of data to be sent by the customer premises equipment unit is smaller than a critical value(system parameter), the NIU 420 transmits data using the contention time slots. If the quantity of data to be sent is greater than the critical value, the NIU 420 requests for the reserved time slot to the MAC processor unit 220, and, being allocated the reserved time slots from the MAC processor unit 220, transmits data using the reserved time slots. Here, the critical value, i.e., a system parameter, is identical in the every customer premises equipment units. The critical value has a multiple of one upstream frame(53 bytes) that DAVIC recommends.

A procedure that a subscriber or customer performs a data communication in the wide band wireless multimedia communication system according to the present invention, will be explained.

When a user executes a web browser in a personal computer(PC) 440 to start a data communication, the PC 440 provides an internet initiating message to the NIU 420. Being received the internet initiating message, the NIU 420 first issues the setup signaling message to the MAC processor unit 220 to perform the ATM connection. The general data except the signaling message can be distinguished by VPI and VCI of the ATM cell. The NIU 420 issues a reserved channel request message to the MAC processor unit 220. When the NIU 420 sends up an ATM setup signaling message to the head-end unit 200, this message is longer than 100 bytes according to Q.2931 of ITU-T or UNI4.0 of ATM Forum. This is longer than the frame specified by DAVIC(see FIG. 7), and thus two or more frames are necessary. The setup message is an important one in that the NIU 420 first sets up a connection. Since this message is sensitive to the time delay, to send this channel request message, it is necessary to be allocated the reserved time slots from the NIU 420, and thereafter to send the setup signaling message using the reserved time slots. From then on, a variety of signaling messages are sent by the contention time slots. When the response to the setup message is received from the MAC processor unit 220, a regular data communication is performed.

Figure 8:
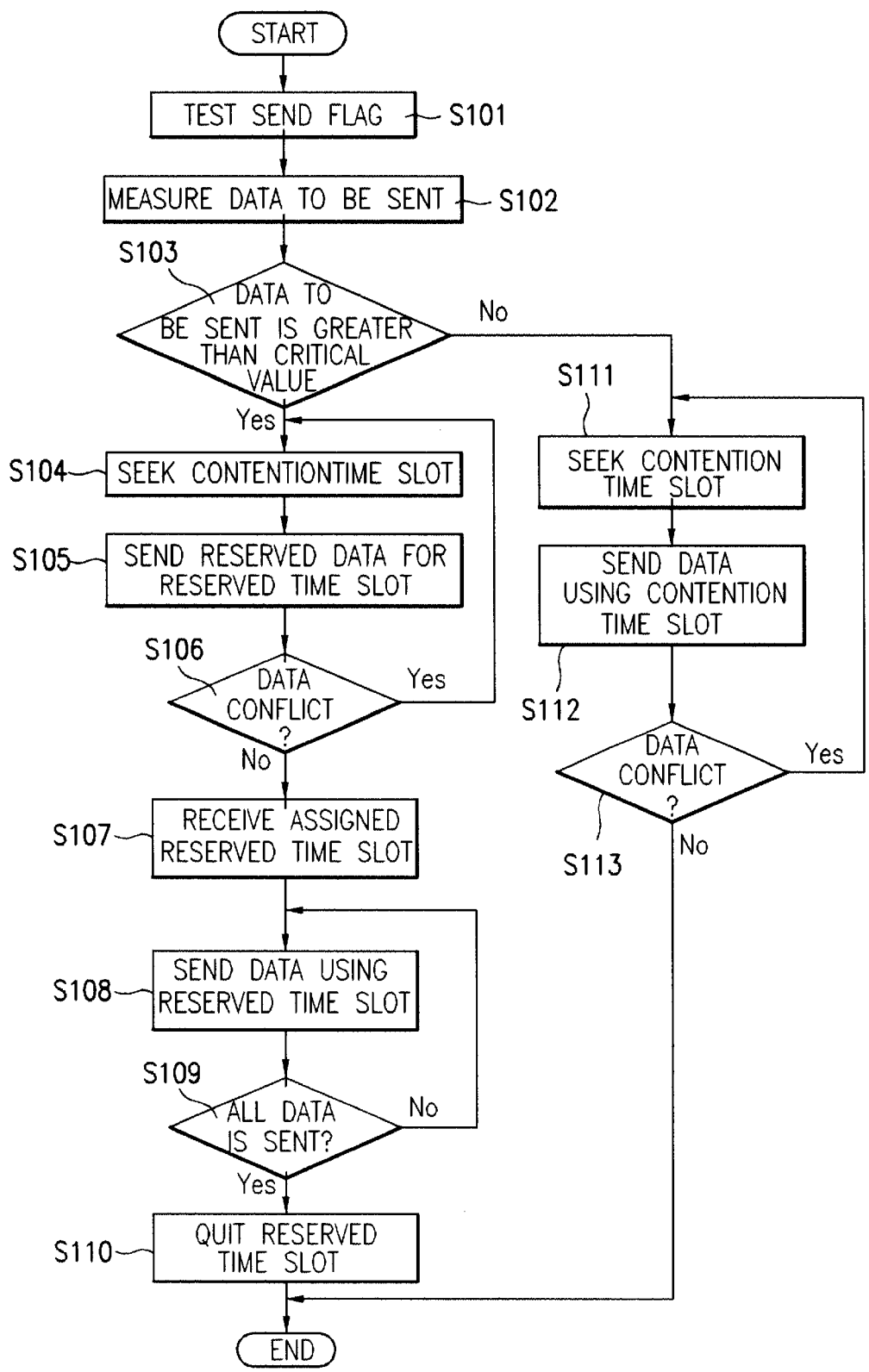
FIG. 8 is a flowchart showing a data sending procedure when in use of an internet according to the present invention.
Figure 9:
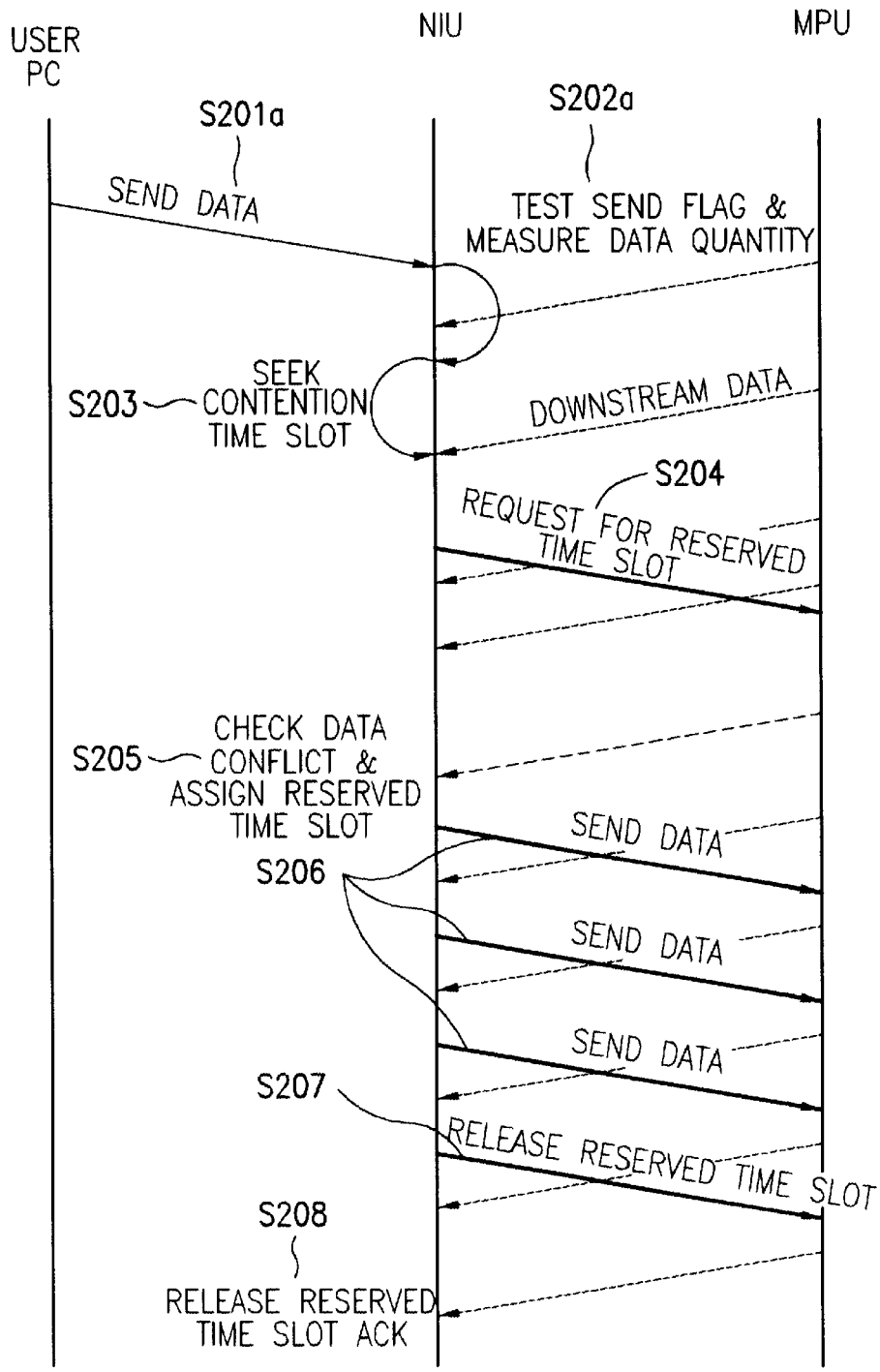
FIG. 9 is a flowchart showing a channel allocation procedure in the case that the two or more frames are to be sent in FIG. 8.
Figure 10:
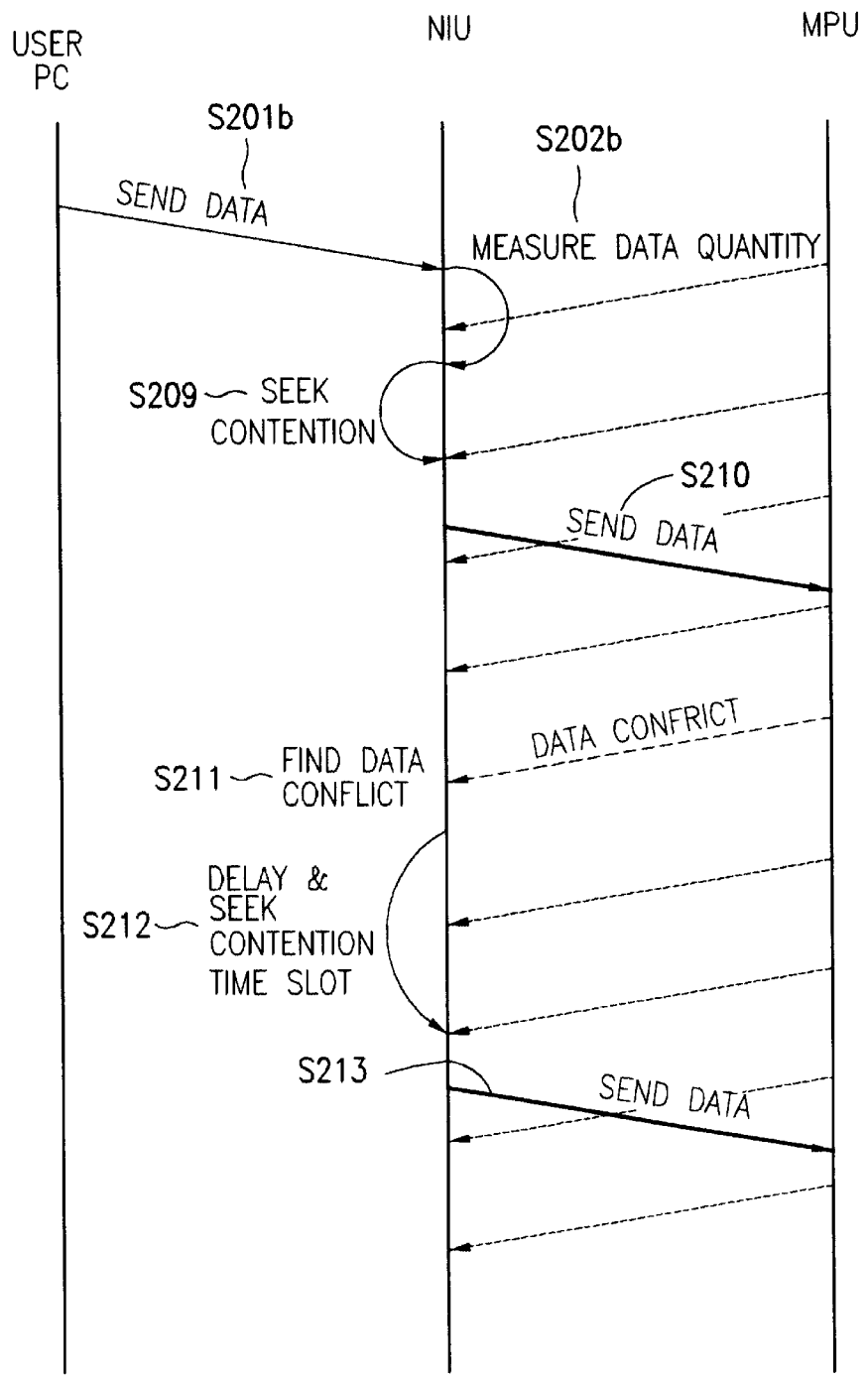
FIG. 10 is a flowchart showing a channel allocation procedure in the case that the one frame is to be sent in FIG. 8.

At this time, a situation may occur that a user sends a message by manipulating a mouse or a keyboard while enjoying an internet communication. A flowchart shown in FIG. 8 explains this case. FIGS. 8 to 10 is the cases where the critical value is "1". If the critical value is "1", it directs to the ATM cell 1.

Referring to FIGS. 8 to 10, the NIU 420 continually tests a send flag of the frame sent by a user, so as to check whether there is data or not(S101). When a user sends data(S201*a*, S201*b*), the NIU 420 sets the send flag. If the send flag is set, the quantity of the data stored in a send buffer is measured (S102). Successively, the quantity of the data to be sent is judged whether it is greater than the critical value, e.g., one frame(S103, S202*a*, S202*b*). In this judgement step, if the data to be sent is greater than the critical value, the contention time slot usable for the messages sent down from the MAC processor unit 220 is sought(S104, S203). Thereafter, a reserved message for reserved time slots is sent using the contention time slots(S105, S204). Successively, data conflict is sought from the messages sent down from the MAC processor unit 220(S106, S205). In this judgement step (S106), if found a data conflict, the step S104 is repeated again, and if not found a data conflict, the allocated reserved time slot is received(S107, S205). Sequentially, the data stored in the send buffer is sent by using the allocated reserved time slot(S108, S206). Successively, whether all of the data and frame is completely sent is checked(S109), and if it is checked that the data to be sent still remains, the data sending step S108 is repeated again. If the data sending is completed, the current reserved time slot is released(S110, S207) and all of the event ends.

On the other hand, in the step S103, if the quantity of data to be sent is smaller than the critical value, the contention time slot is sought from the downstream message sent down from the MAC processor unit 220, as shown in FIG. 10(S111, S209). Successively, the data is sent by using a contention time slot(S112, S210). Thereafter, a data conflict to the data sent down from the MAC processor unit 220 is judged(S113, S211). If a data conflict is found, the step of seeking contention time slot(S111) is repeated, while if no data conflict is found and the data transmission is successfully done, the whole procedure is completed.

From the foregoing, when in performance of an internet communication using wide band wireless multimedia communication system according to the present invention, as the reserved channel or the contention channel can be selected in accordance with the quantity of the data to be sent, given channels can be efficiently utilized. Moreover, since the data smaller than the critical value is directly sent using contention time slot, without providing any request message to the MAC processor unit, the load to the MAC processor unit can be lessen. Therefore, without adding the additional equipments to the communication system, the system can accommodate more subscribers.

What is claimed is:

1. A channel allocation method on performing a data communication in a wide band wireless multi-media communication system, comprising:

measuring a quantity of data to be sent at a customer premises equipment unit; and determining whether to use a contention time slot or a reserved time slot of a communication frame based on the quantity of data to be sent, without requiring an additional indication as to which type of time slot of the communication frame to use, the communication frame including both the contention time slot and the reserved time slot, wherein it is determined that data communication should be performed using the contention time slot of the communication frame, if the measured quantity of the data is smaller than a certain critical value; and it is determined that data communication should be performed using the reserved time slot of the communication frame, if the measured quantity of the data is greater than the certain critical value.

2. The channel allocation method according to claim 1, wherein the channel allocation is performed in the direction from a customer premises equipment unit to a head-end unit.

3. The channel allocation method according to claim 1, wherein the critical value is a variable system parameter.

4. The channel allocation method according to claim 3, wherein the critical value is set to a multiple of an asynchronous transfer mode (ATM) cell.

5. The method of claim 1, wherein measuring the quantity of data is performed in accordance with a value of a send flag.

6. The method of claim 1, wherein measuring the quantity of data comprises:

testing a send flag of a frame sent by a user to determine whether the data is in a send buffer; and measuring the quantity of data stored in the send buffer, when the send flag is set.

7. A communication resource allocation method, comprising:

measuring a quantity of data to be transmitted;

determining whether to use a contention time slot or a reserved time slot of a communication frame based on the quantity of data to be sent, without requiring an independent indication as to which type of time slot of a communication frame to use, the communication frame including both the contention time slot and the reserved time slot;

transmitting the data using the contention time slot of the communication frame if the measured quantity is less than or equal to a specified value; and transmitting the data using the reserved time slot of the communication frame if the measured quantity exceeds the specified value.

8. The method of claim 7, wherein a subscriber terminal measures the quantity of data, determines whether the quantity exceeds the specified value, and transmits the information.

9. The method of claim 7, further comprising sending a request for an allocation of the reserved time slot to a hub terminal.

10. The method of claim 9, wherein the request is transmitted using the contention time slot.

11. The method of claim 9, wherein the request may be transmitted using any of a plurality of contention time slots within a multiple access communication frame.

12. The method of claim 7, further comprising transmitting the data without requesting an allocation of a time slot, if the measured quantity is less than or equal to the specified value.

13. The method of claim 7, wherein the data is payload data.

14. The method of claim 7, wherein the data is signaling data.

15. The method of claim 7, wherein a hub terminal does not allocate a time slot to a subscriber terminal for the transmission of the data using the contention time slot.

16. The method of claim 7, comprising:

transmitting a request from a subscriber terminal to a hub terminal for an allocation of the reserved time slot;

transmitting an identification of the reserved time slot from the hub terminal to the subscriber terminal; and transmitting the data from the subscriber terminal to the hub terminal using the identified reserved time slot.

17. The method of claim 7, wherein measuring the quantity of data is performed in accordance with a value of a send flag.

18. The method of claim 7, wherein measuring the quantity of data comprises:

testing a send flag of a frame sent by a user to determine whether the data is in a send buffer; and measuring the quantity of data stored in the send buffer, when the send flag is set.

19. The method of claim 7, wherein transmitting the data comprises:

requesting a reserved time slot from a head-end unit, using a contention time slot;

allocating the requested reserved time slot in response to the request; and transmitting the data using the allocated reserved time slot.

20. The method of claim 19, wherein the request for the reserved time slot is performed by sending a reserved message.

21. The method of claim 7, wherein the quantity of a setup signaling message is not measured.

22. The method of claim 21, wherein the setup signaling message is distinguished from general information by VPI or VCI of an ATM cell.

23. The method of claim 21, wherein the setup signaling message is sent using reserved time slots, and the other signaling message is sent using contention time slots.

* * * * *